(12) United States Patent
Hangartner et al.

(10) Patent No.: US 11,498,199 B2
(45) Date of Patent: Nov. 15, 2022

(54) UTILITY KNIFE WITH TAPE HOOK RECESS

(71) Applicant: Milwaukee Electric Tool Corporation, Brookfield, WI (US)

(72) Inventors: Scott M. Hangartner, Hartland, WI (US); Andrew M. Tuchscherer, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 104 days.

(21) Appl. No.: 16/518,283

(22) Filed: Jul. 22, 2019

(65) Prior Publication Data

US 2020/0009714 A1    Jan. 9, 2020

Related U.S. Application Data

(63) Continuation of application No. PCT/US2019/041022, filed on Jul. 9, 2019.
(Continued)

(51) Int. Cl.
| | | |
|---|---|---|
| *B26B 5/00* | (2006.01) | |
| *B25G 1/10* | (2006.01) | |
| *G01B 3/1084* | (2020.01) | |
| *G01B 3/1056* | (2020.01) | |
| *B26B 3/00* | (2006.01) | |
| *B25G 1/08* | (2006.01) | |
| *G01B 3/1089* | (2020.01) | |

(52) U.S. Cl.
CPC .............. *B25G 1/10* (2013.01); *B26B 5/003* (2013.01); *G01B 3/1056* (2013.01); *G01B 3/1084* (2013.01); *B25G 1/08* (2013.01); *B26B 3/00* (2013.01); *G01B 3/1089* (2020.01)

(58) Field of Classification Search
CPC ... B25F 1/006; B25F 1/04; B25G 1/08; B25G 1/10; B26B 3/00; B26B 5/003
See application file for complete search history.

(56) References Cited

U.S. PATENT DOCUMENTS 2,215,216 A * 9/1940 Gits .................. B26B 5/005
30/320
3,448,518 A * 6/1969 Sklar ................ B26B 5/002
30/162
(Continued)

FOREIGN PATENT DOCUMENTS

CN        1162518 A     10/1997
CN     101056745 A     10/2007
(Continued)

OTHER PUBLICATIONS

International Search Report and Written Opinion for International Application No. PCT/US2019/041022 dated Oct. 24, 2019, 13 pages.

*Primary Examiner* — Stephen Choi
(74) *Attorney, Agent, or Firm* — Reinhart Boerner Van Deuren s.c.

(57) ABSTRACT

A utility knife includes a body having a front end and a rear end opposite the front end. A blade holder, supported by the body, is moveable relative to the body, to move a blade between an extended position and a retracted position. The blade extends through a blade aperture when in the extended position. The blade aperture is sized to receive a hook attached to the blade of a tape measure.

10 Claims, 22 Drawing Sheets

Related U.S. Application Data

(60) Provisional application No. 62/695,573, filed on Jul. 9, 2018.

(56) References Cited

U.S. PATENT DOCUMENTS

| | | | |
|---|---|---|---|
| 3,604,113 | A | 9/1971 | Cuscovitch |
| 3,857,176 | A | 12/1974 | Quenot |
| 3,872,591 | A | 3/1975 | Quenot |
| 4,320,576 | A * | 3/1982 | Beermann ............... B26B 5/003 30/162 |
| 5,386,632 | A | 2/1995 | Schmidt |
| 5,426,855 | A | 6/1995 | Keklak et al. |
| 5,613,300 | A | 3/1997 | Schmidt |
| 5,644,843 | A | 7/1997 | Young |
| 5,737,841 | A | 4/1998 | McHenry et al. |
| 5,765,247 | A | 6/1998 | Seber et al. |
| 5,769,094 | A | 6/1998 | Jenkins, Jr. et al. |
| 5,890,294 | A | 4/1999 | Keklak et al. |
| 6,122,829 | A | 9/2000 | McHenry et al. |
| 6,170,104 | B1 | 1/2001 | Seber et al. |
| 6,192,589 | B1 | 2/2001 | Martone et al. |
| 6,233,769 | B1 | 5/2001 | Seber et al. |
| 6,256,887 | B1 | 7/2001 | Osborne |
| 6,389,625 | B1 | 5/2002 | Rivera |
| 6,438,848 | B1 | 8/2002 | McHenry et al. |
| 6,454,427 | B1 | 9/2002 | Chen |
| 6,487,740 | B2 | 12/2002 | Seber et al. |
| 6,510,767 | B1 | 1/2003 | Rivera |
| 6,763,543 | B2 | 7/2004 | Rivera |
| 6,802,094 | B2 | 10/2004 | Seber et al. |
| 6,877,229 | B2 | 4/2005 | Sakai |
| 6,990,702 | B2 | 1/2006 | Rivera |
| 7,051,627 | B2 | 5/2006 | Rivera |
| 7,080,423 | B2 | 7/2006 | Seber et al. |
| 7,316,070 | B2 | 1/2008 | Green |
| 7,389,587 | B2 | 6/2008 | Di Bitonto et al. |
| RE41,259 | E | 4/2010 | McHenry et al. |
| 7,987,602 | B2 | 8/2011 | Kanemoto et al. |
| 8,220,161 | B2 | 7/2012 | Chang |
| 8,413,337 | B2 | 4/2013 | Price |
| 8,572,850 | B2 | 11/2013 | Wu |
| 8,621,753 | B2 | 1/2014 | Price |
| 8,793,882 | B2 | 8/2014 | Kanemoto et al. |
| 8,904,649 | B2 | 12/2014 | Garavaglia et al. |
| D763,653 | S * | 8/2016 | Horovitz ........................ D8/99 |
| 9,550,301 | B2 | 1/2017 | Kanemoto et al. |
| 9,656,398 | B2 | 5/2017 | Wang |
| 2003/0037444 | A1 | 2/2003 | Chunn |
| 2005/0188541 | A1 | 9/2005 | Brown et al. |
| 2007/0011882 | A1 | 1/2007 | Ping |
| 2007/0214652 | A1 | 9/2007 | Ping |
| 2008/0086895 | A1 | 4/2008 | Parks |
| 2008/0172830 | A1 | 7/2008 | Zeng |
| 2009/0255127 | A1 | 10/2009 | Seymour et al. |
| 2010/0037468 | A1 | 2/2010 | Rowlay et al. |
| 2012/0073143 | A1 * | 3/2012 | Honda ................... B26B 5/002 30/162 |
| 2013/0255002 | A1 | 10/2013 | Keers et al. |
| 2014/0373364 | A1 | 12/2014 | Li |
| 2016/0039100 | A1 | 2/2016 | Wang |
| 2016/0288344 | A1 | 10/2016 | Squiers et al. |

FOREIGN PATENT DOCUMENTS

| | | |
|---|---|---|
| CN | 201154485 Y | 11/2008 |
| CN | 101659061 A | 3/2010 |
| CN | 102463577 A | 5/2012 |
| CN | 202556414 U | 11/2012 |
| CN | 202592392 U | 12/2012 |
| EP | 0100377 B1 | 9/1987 |
| EP | 1694474 | 1/2011 |
| JP | 2012-090860 | 5/2012 |
| KR | 20-0337207 | 12/2003 |
| WO | WO99/52687 | 10/1999 |

\* cited by examiner

UTILITY KNIFE WITH TAPE HOOK RECESS

CROSS-REFERENCE TO RELATED PATENT APPLICATION

The present application is a continuation of International Application No. PCT/US2019/041022, filed Jul. 9, 2019, which claims the benefit of and priority to U.S. Provisional Application No. 62/695,573, filed Jul. 9, 2018, which are incorporated herein by reference in their entireties.

BACKGROUND

The present invention relates to utility knives and, more particularly, to a utility knife with an integrated tape hook recess.

SUMMARY

A tape measure may be used to guide a utility knife when cutting or scoring sheet material, such as drywall or foam board, to a desired width. However, keeping a hook of the tape measure positioned against the utility knife while cutting can be difficult and cumbersome.

In one aspect, a utility knife may generally include a blade coupled to a body, the body including a first body portion and a second body portion. The first body portion includes a recess that defines a pocket between the blade and the first body portion. The pocket is configured to receive a tape measure hook.

In another aspect, a utility knife may generally include a body, a blade holder pivotally coupled to the body, and a blade coupled to the blade holder such that the blade projects from a front end of the blade holder. The blade holder includes a recess adjacent the blade that is configured to receive a tape measure hook.

In another aspect, a utility knife includes a body having a front end and a rear end opposite the front end. The utility knife includes a blade holder, supported by the body, and the blade holder is moveable relative to the body, to move a blade between an extended position and a retracted position. The blade extends through a blade aperture when in the extended position. The blade aperture includes a first end section having a width and a height, a central section having a width and a height, and a second end section having a width and a height. The width of the central section is greater than the respective widths of the first end section and the second end section. The height of the central section is greater than the respective heights of the first end section and the second end section.

In another aspect, a utility knife includes a body having a front end and a rear end opposite the front end. The utility knife includes a blade holder supported by the body, and the blade holder is moveable relative to the body to move a blade between an extended position and a retracted position. The blade has a thickness. The blade extends through a blade aperture when in the extended position. The blade aperture includes a first end section having a width, a central section having a width, and a second end section having a width. The respective widths of the first end section and the second end section are from 100% to 125% of the thickness of the blade. The width of the central section is greater than 150% of the thickness of the blade.

In another aspect, a method of using a utility knife includes grasping a utility knife having a blade aperture and a blade extending from the blade aperture. A tape measure hook attached to a tape blade of a tape measure is coupled to the blade aperture of the utility knife. The tape blade of the tape measure is extended from a housing of the tape measure along a workpiece to a desired measurement of the workpiece while the tape measure hook is coupled to the blade aperture of the utility knife. The workpiece is cut with the blade of the utility knife at the desired measurement while the tape measure hook is coupled to the blade aperture of the utility knife.

Other features and aspects of the invention will become apparent by consideration of the following detailed description and accompanying drawings.

DETAILED DESCRIPTION

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Use of 'including and "comprising" and variations thereof as used herein is meant to encompass the items listed thereafter and equivalents thereof as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Figure 1:
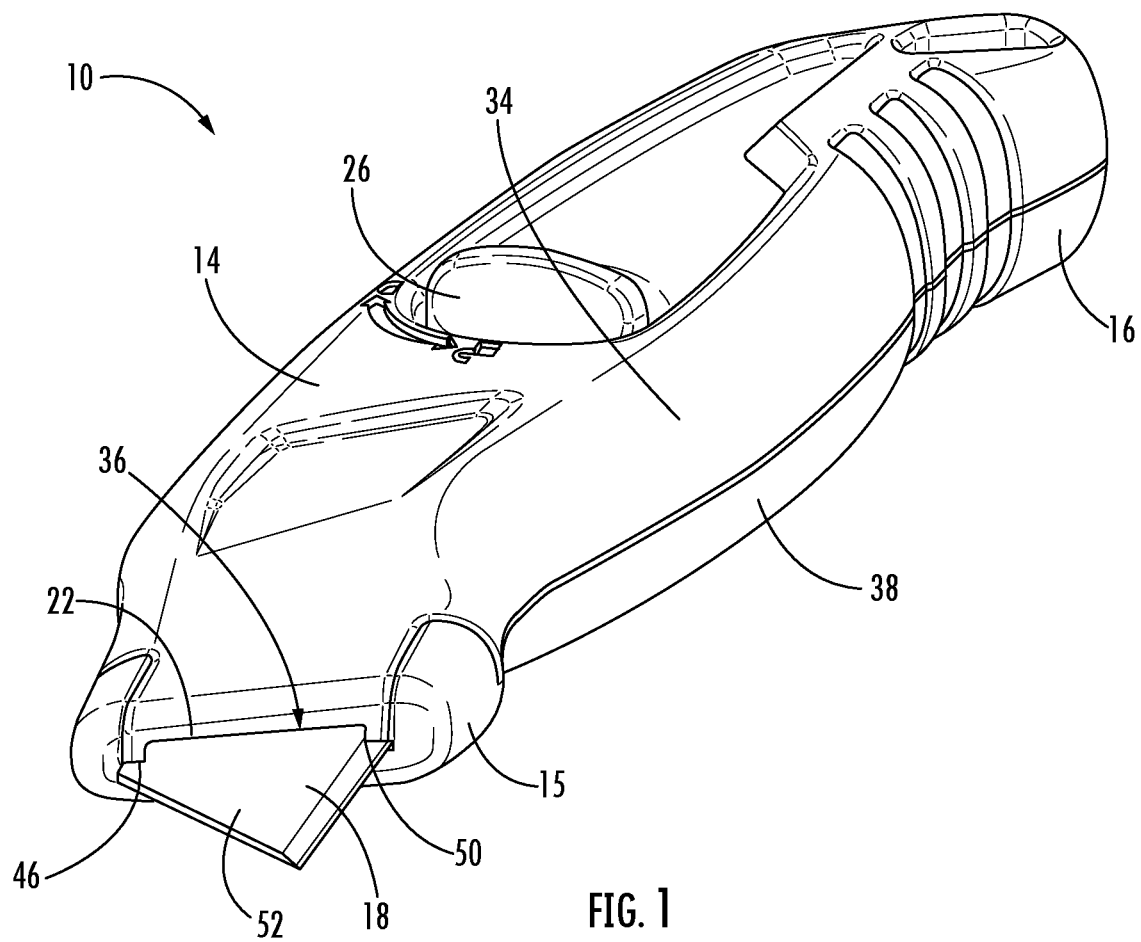
FIG. 1 is a perspective view of a utility knife with an integrated tape hook recess according to one embodiment of the invention.
Figure 2:
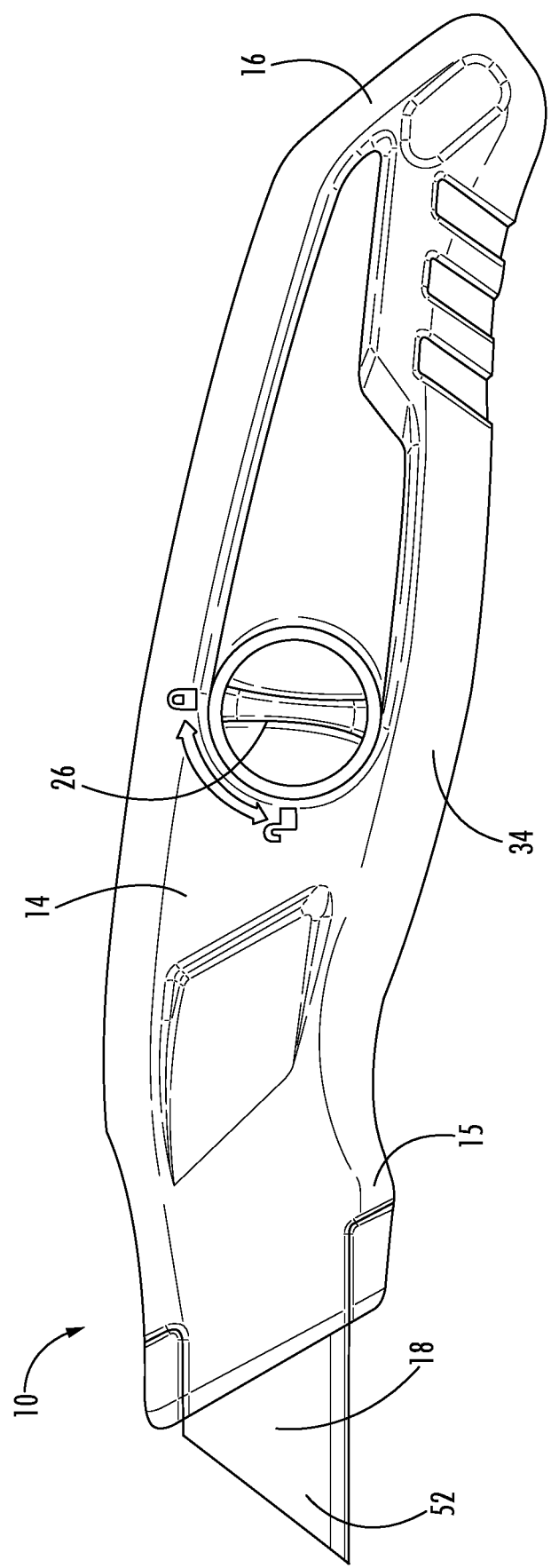
FIG. 2 is a side view of the utility knife of FIG. 1.
Figure 3:
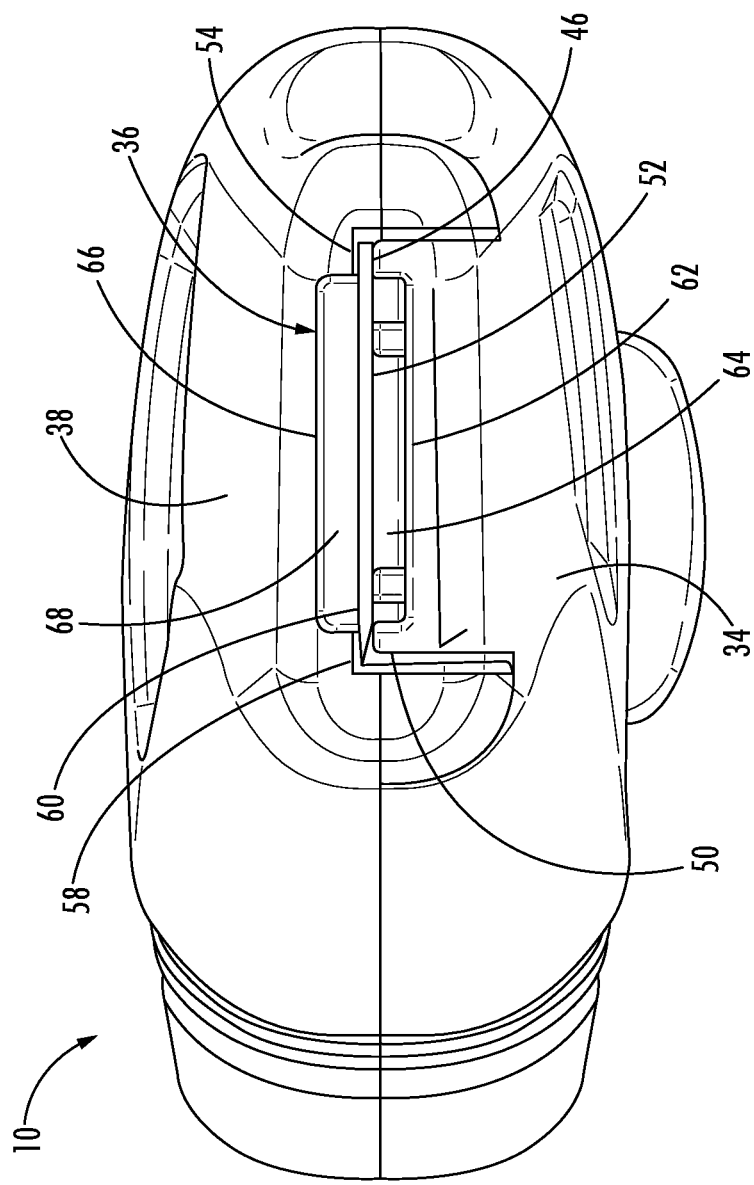
FIG. 3 is a front view of the utility knife of FIG. 1.

FIGS. 1-3 illustrate a utility knife 10 according to one embodiment. The utility knife 10 includes a body or handle 14 having a front end 15 and a rear end 16 opposite the front end 15. A blade 18 is supported by the body 14 and extends through the front end 15. The utility knife 10 in the illustrated embodiment has a fixed blade design, such that the blade 18 is fixed in relation to the body 14. In other embodiments, the blade 18 may be supported on a movable blade holder.

The body 14 includes a first body portion 34 and a second body portion 38, with the blade 18 being situated between the first body portion 34 and the second body portion 38. The first and second body portions 34, 38 collectively define an aperture 36 in the front end 15 of the body 14 through which the blade 18 extends. The first body portion 34 and the second body portion 38 extend the length of the body 14. In the illustrated embodiment, a lock 26 is disposed on the body 14 and is rotatable between a locked position and an unlocked position to selectively couple and release first and second body portions 34, 38. In other words, when the lock 26 is rotated to the unlocked position, the first body portion 34 is separable from the second body portion 38 to provide access to the interior of the body 14 (e.g., to remove and replace the blade 18). In other embodiments, the body portions 34, 38 may be coupled together in any other suitable manner (e.g., via a plurality of fasteners, a snap fit, etc.).

Referring to FIG. 3, the first body portion 34 includes a first engagement surface 46 and a second engagement surface 50. The first engagement surface 46 and the second engagement surface 50 are in contact with a first side 52 of the blade 18. The second body portion 38 includes a third engagement surface 54 and a fourth engagement surface 58 in contact with a second, opposite side 60 of the blade 18. The blade 18 is thus clamped between the engagement surfaces 46, 50, 54, 58 such that the first and third engagement surfaces 46, 54 inhibit lateral deflection of a top portion of the blade 18, and the second and fourth engagement surfaces 50, 58 inhibit lateral deflection of a bottom portion of the blade 18.

With continued reference to FIG. 3, a first recess 62 is positioned between the first engagement surface 46 and the second engagement surface 50, and a second recess 66 is positioned between the third engagement surface 54 and the fourth engagement surface 58. The first recess 62 defines a gap or pocket 64 between the blade 18 and the first body portion 34, and the second recess 66 defines a gap or pocket 68 between the blade 18 and the second body portion 38. The recesses 62, 66 are thus disposed on opposite lateral sides of the blade 18. The recesses 62, 66 extend into the body 14 along a length direction of the blade 18 and are sized and shaped to be able to receive a hook 70 of a tape measure 74, an example of which is illustrated in FIG. 4.

Figure 4:
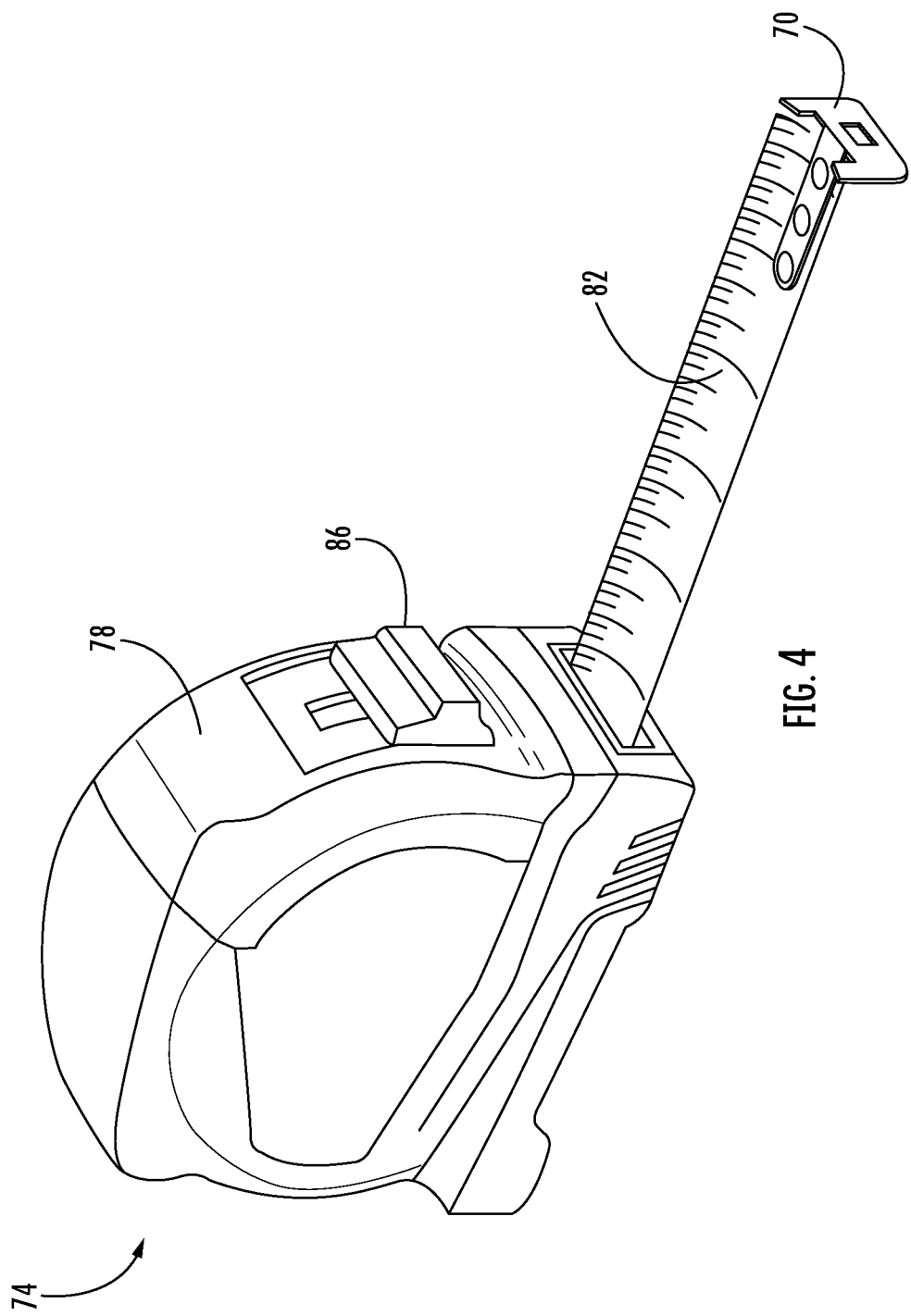
FIG. 4 is a perspective view of an exemplary tape measure engageable with the integrated tape hook recess of the utility knife of FIG. 1.

With reference to FIG. 4, the illustrated tape measure 74 includes a housing 78 and a tape 82 with measurement markings. The tape 82 is extendible from and automatically retractable into the housing 78. The tape measure 74 also includes a locking mechanism 86 to selectively lock the tape 82 in an extended position. The hook 70 is coupled to a distal end of the tape 82.

In use, the hook 70 on the tape measure 74 is hooked into one of the recesses 62, 66 of the utility knife 10. Once hooked, the tape measure 82 is coupled to the utility knife 10 for movement therewith. This allows a user to not have to manually hold the hook 70 or the tape 82 to the utility knife 10. The utility knife 10 and tape measure 74 can then be conveniently used together to make efficient and accurate cuts on a workpiece, which is particularly advantageous when making long cuts such as when cutting sheet material.

Figure 5:
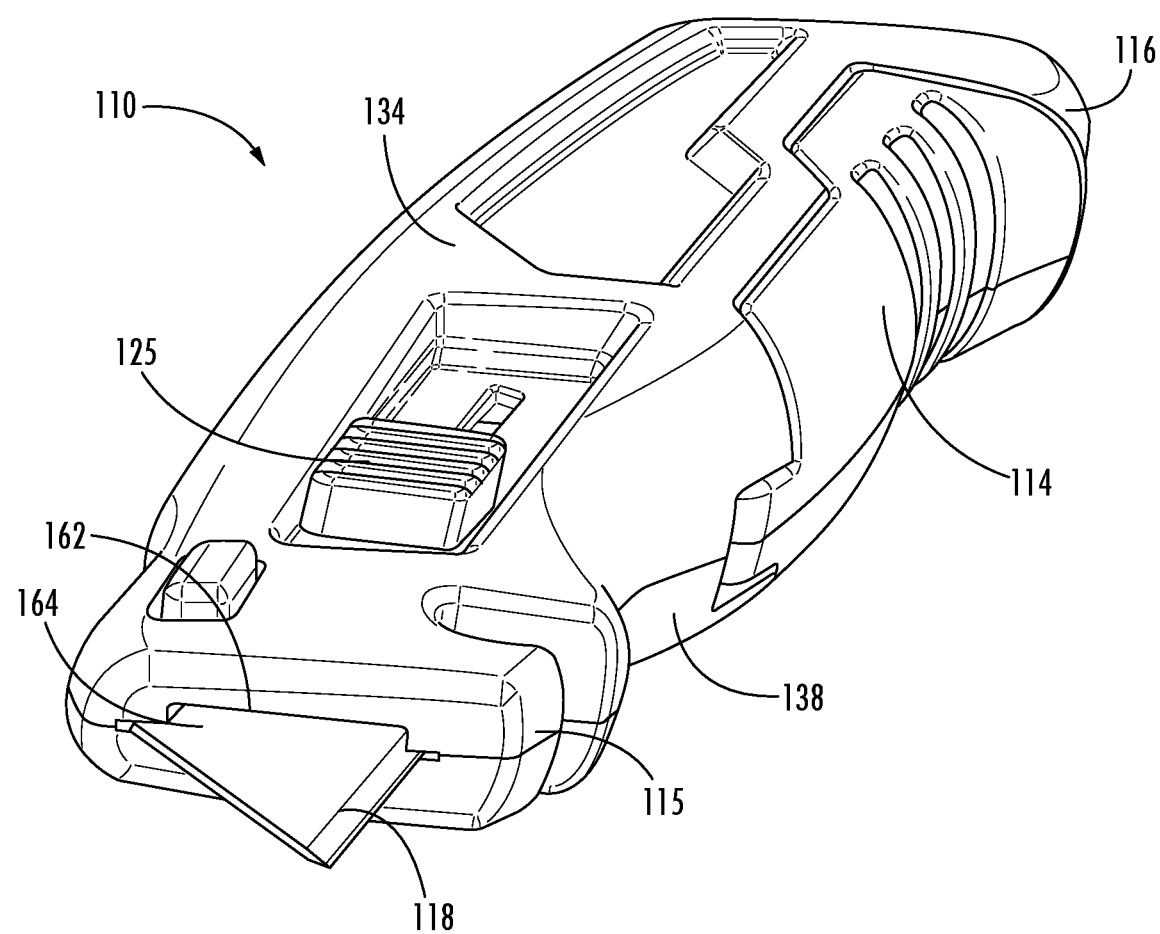
FIG. 5 is a perspective view of a utility knife with an integrated tape hook recess according to another embodiment of the invention.
Figure 6A:
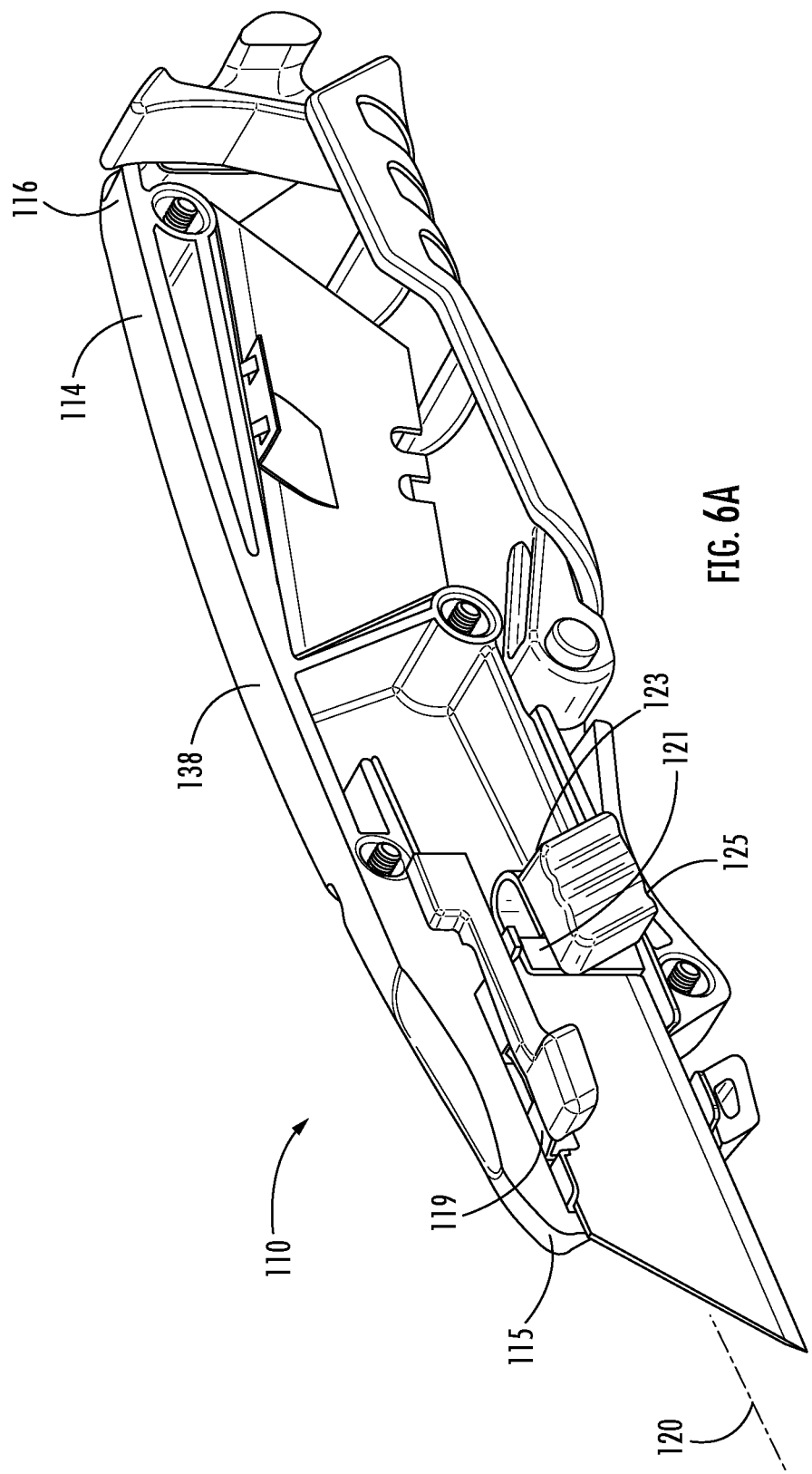
FIG. 6A is a side view of the utility knife of FIG. 5 with a first body portion of the utility knife hidden.
Figure 6B:
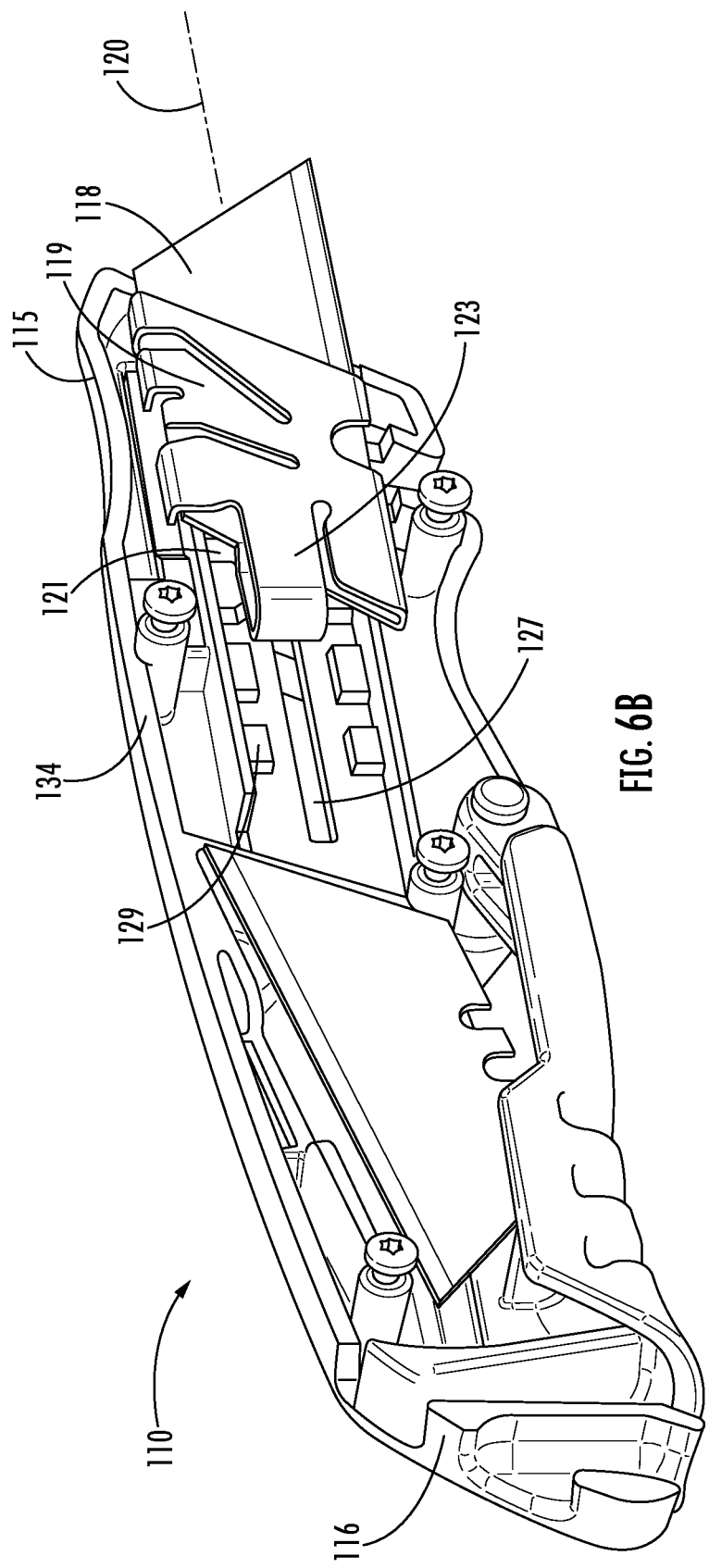
FIG. 6B is an opposite side view of the utility knife of FIG. 5 with a second body portion of the utility knife hidden.
Figure 6C:
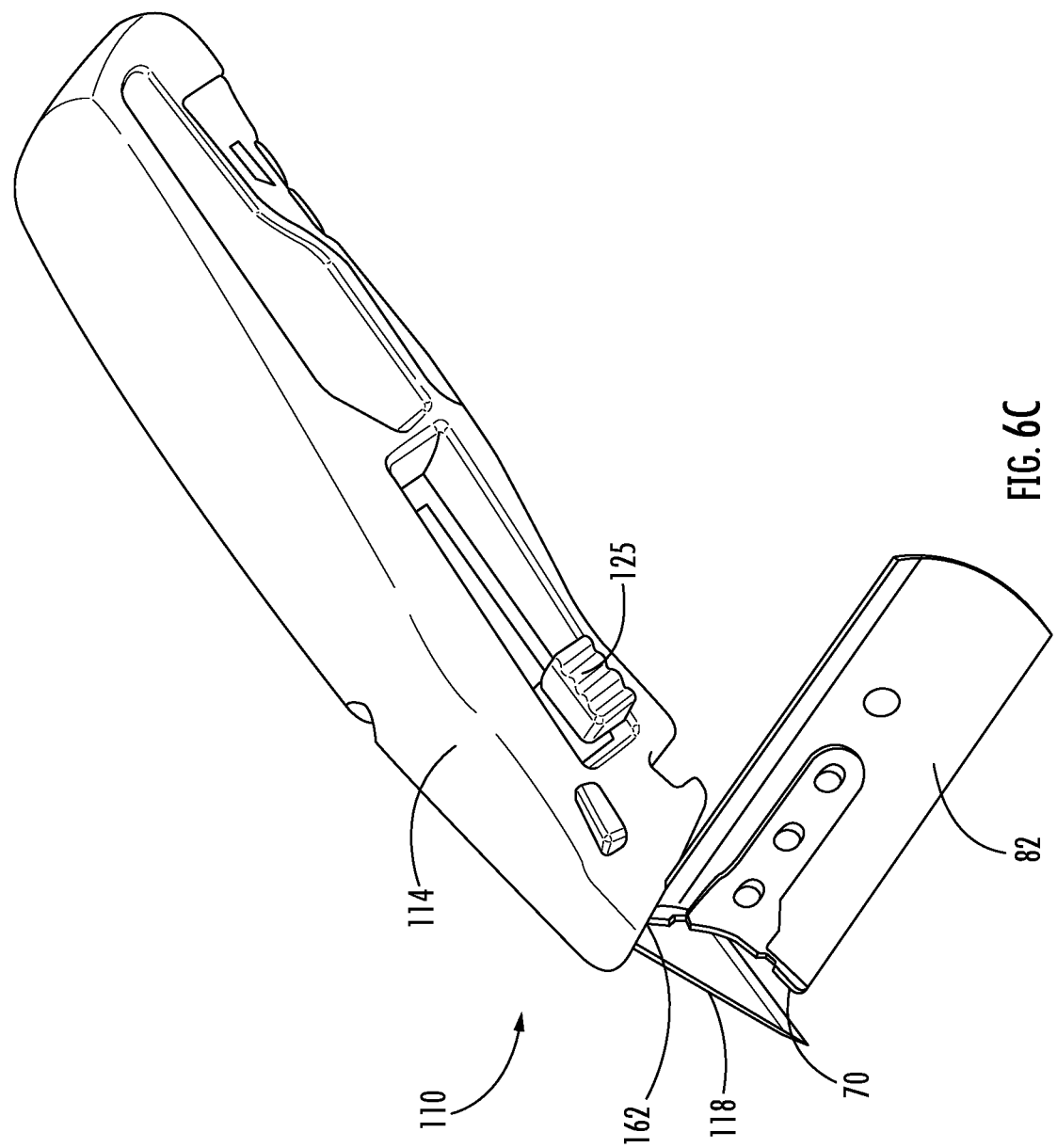
FIG. 6C is a perspective view of the utility knife of FIG. 5 with a tape hook engaged with a tape hook recess of the utility knife.
Figure 6D:
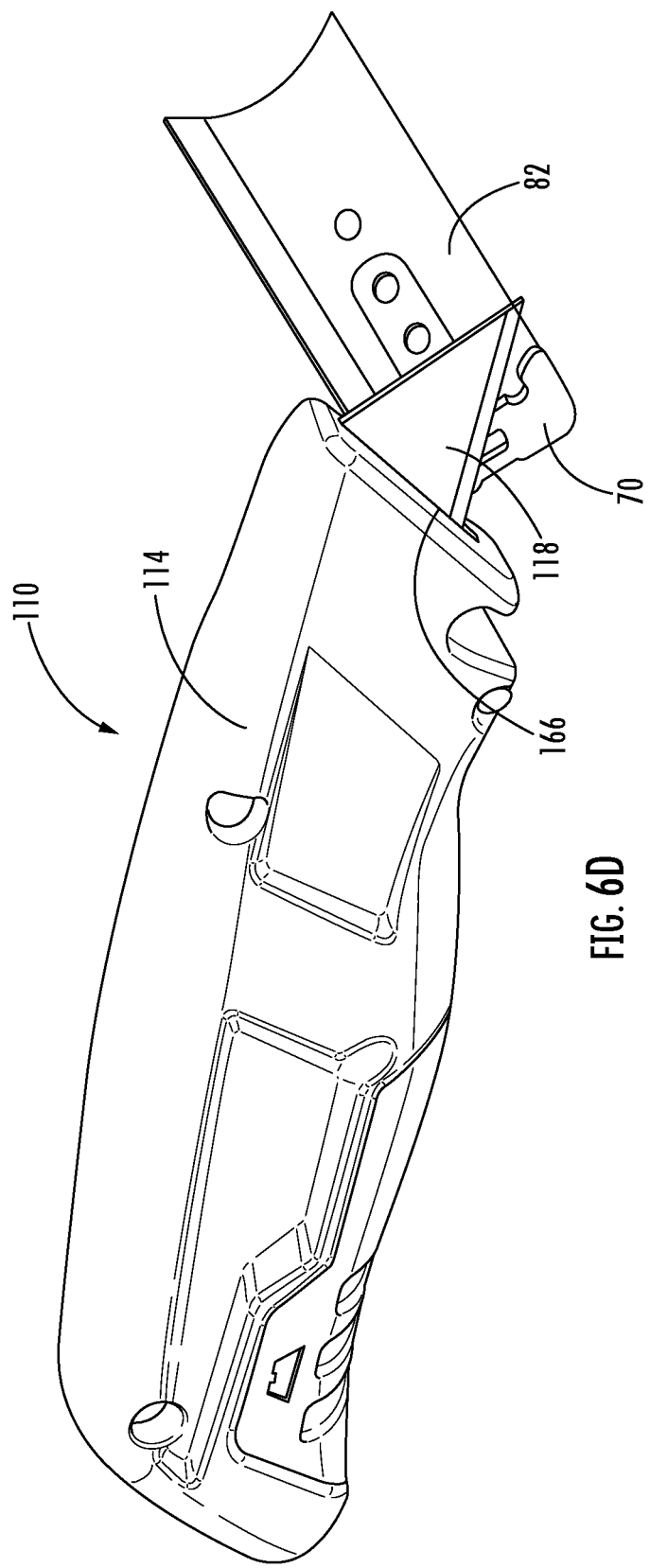
FIG. 6D is another perspective view of the utility knife of FIG. 6C.
Figure 7:
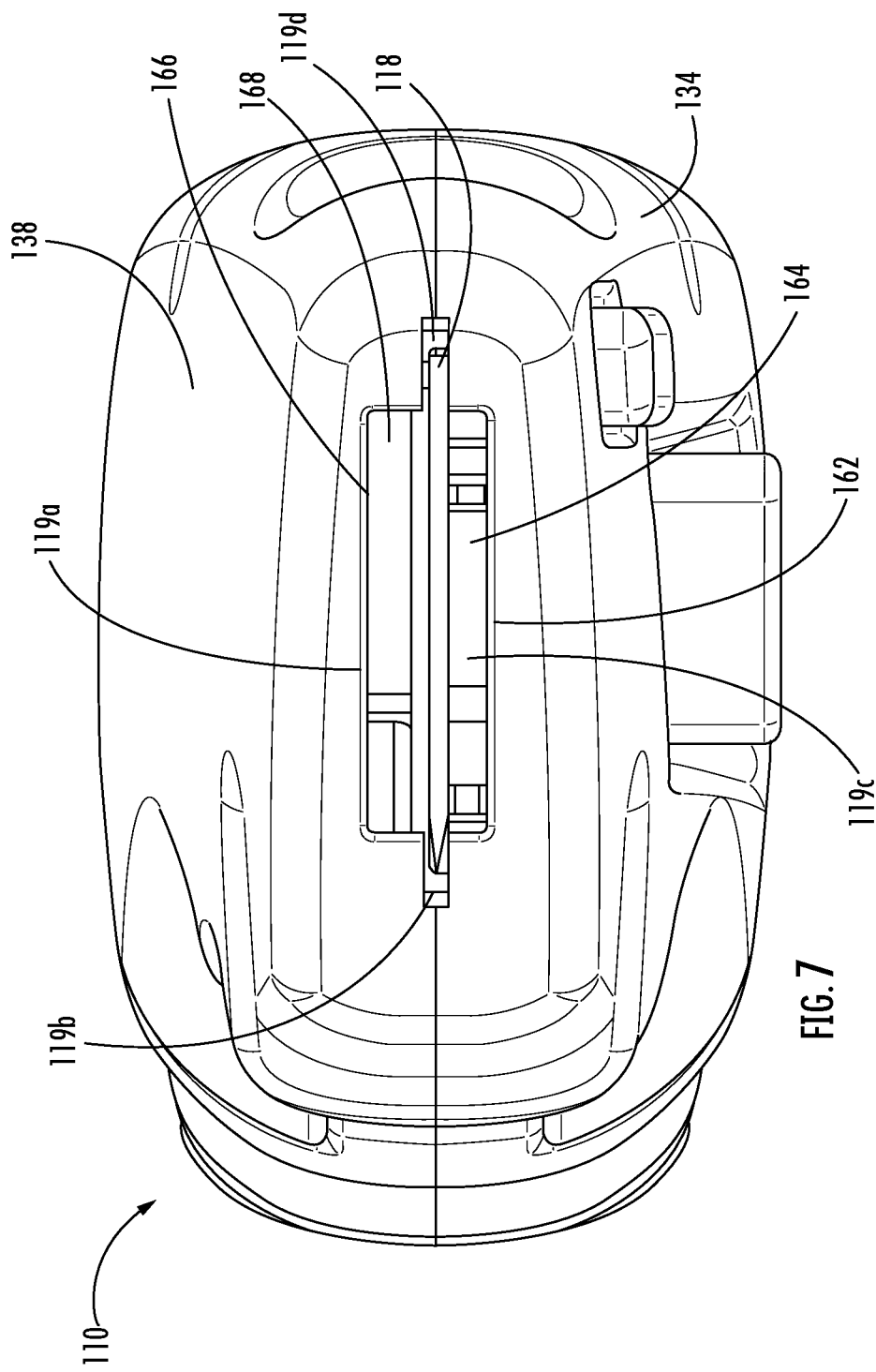
FIG. 7 is a front view of the utility knife of FIG. 5.
Figure 8:
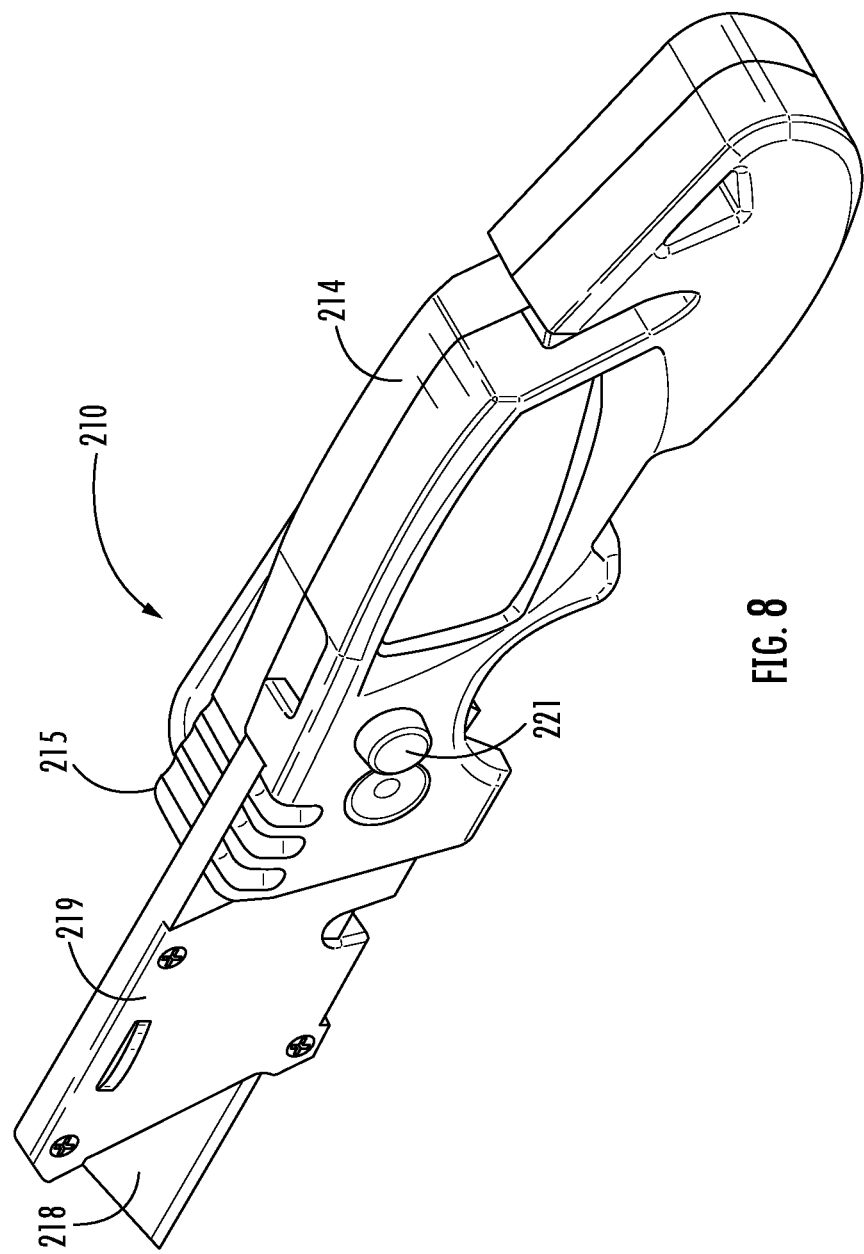
FIG. 8 is a perspective view of a utility knife with an integrated tape hook recess according to another embodiment of the invention.
Figure 9:
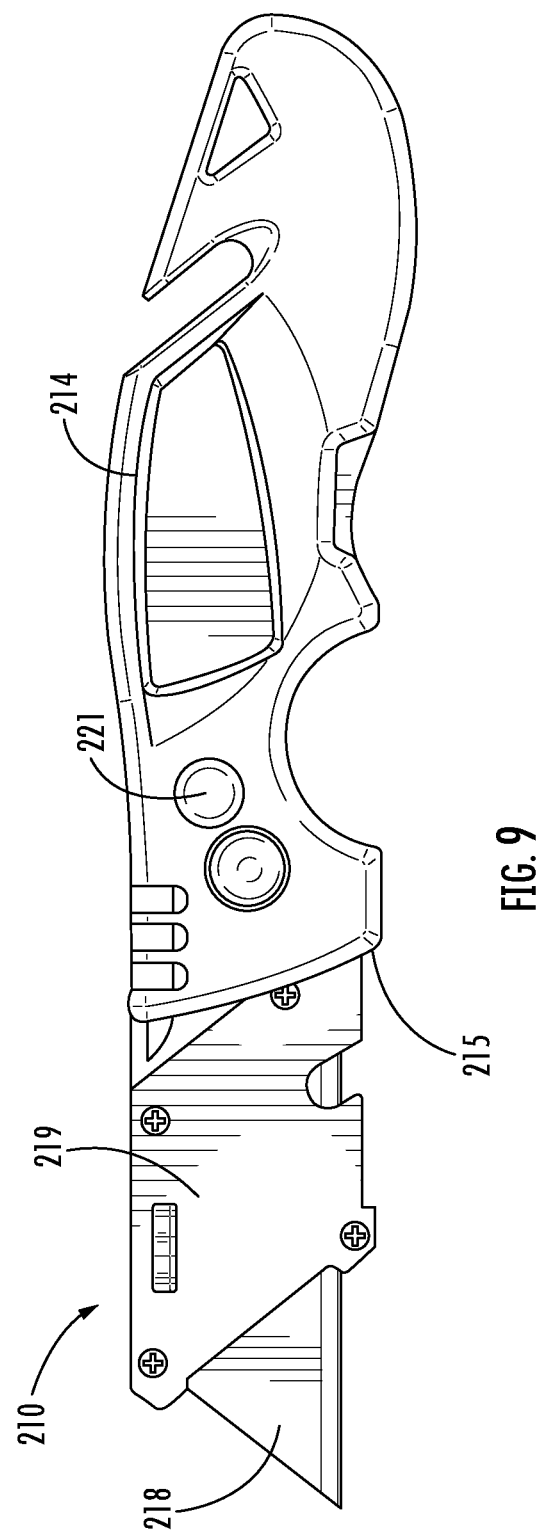
FIG. 9 is a side view of the utility knife of FIG. 8.

FIGS. 5-7 illustrate a utility knife 110 according to another embodiment. The utility knife 110 is similar to the utility knife 10 described above with reference to FIGS. 1-3, and the following description focuses primarily on differences between the utility knife 110 and the utility knife 10. In addition, features of the utility knife 110 corresponding with features of the utility knife 10 are given like reference numbers plus 100.

The utility knife 110 includes a body or handle 114 having a front end 115, a rear end 116 opposite the front end 115, and cooperating first and second body portions 134, 138 (FIG. 5). A blade 118 is supported by the body 114 and extends through the front end 115. The utility knife 110 in the illustrated embodiment has a slidable blade design, such that the blade 118 is coupled to a blade holder 119 (FIGS. 6A-B), which is slidable along a longitudinal axis 120 of the body 114 between a fully extended position (illustrated in FIGS. 5-7), in which the blade 118 projects a maximum distance from the front end 115, and a fully retracted position (not shown), in which the blade 118 is fully enclosed by the body 114.

In some embodiments, the utility knife 110 includes a body 114 having a front end 115 and a rear end 116 opposite the front end 115 (FIG. 5). A blade holder 119, supported by the body 114, is moveable relative to the body 114, to move a blade 118 between an extended position (FIGS. 5-7) and a retracted position (not shown). The blade 118 extends through a blade aperture 119a when in the extended position. FIG. 7 illustrates that the blade aperture 119a includes a first end section 119b having a width and a height, a central section 119c having a width and a height, and a second end 119d section having a width and a height. The width of the central section 119c is greater than the respective widths of the first end section 119b and the second end section 119d. The height of the central section 119c is greater than the respective heights of the first end section 119b and the second end section 119d.

In some embodiments of the utility knife 110 (FIG. 7), the respective widths of the first end section 119b and the second end section 119d of the blade aperture 119a are each less than 50% of the width of the central section 119c of the blade aperture 119a. The height of the central section 119c of the blade aperture 119a is greater than 80% of both of the respective heights of the first end section 119b and the second end section 119d of the blade aperture 119a.

In another embodiment of the utility knife 110 (FIG. 7), the respective widths of the first end section 119b and the second end section 119d of the blade aperture 119a are each less than 25% of the width of the central section 119c of the blade aperture 119a. The height of the central section 119c of the blade aperture 119a is greater than 90% of both of the respective heights of the first end section 119b and the second end section 119d of the blade aperture 119a.

In a further embodiment of the utility knife 110 (FIG. 7), the width of the first end section 119b is equal to the width of the second end section 119d of the blade aperture 119a. The height of the first end section 119b is equal to the height of the second end section 119d of the blade aperture 119a.

In yet another embodiment of the utility knife (FIG. 7), the blade aperture 119a is defined in the front end 115 of the body 114. The blade holder 119 is slidable relative to the body 114 to move the blade 118 through the blade aperture 119a between the extended position (FIGS. 5-7) and the retracted position (not shown).

In other embodiments, the utility knife 110 includes a body 114 having a front end 115 and a rear end 116 opposite the front end 115 (FIG. 5). A blade holder 119 is supported by the body 114, and is moveable relative to the body 114 to move a blade 118 between an extended position (FIGS. 5-7) and a retracted position (not shown). The blade 118 has a thickness. The blade 118 extends through a blade aperture 119a when in the extended position. The blade aperture 119a includes a first end section 119b having a width, a central section 119c having a width, and a second end section 119d having a width. The respective widths of the first end section 119b and the second end section 119d are from 100% to 125% of the thickness of the blade 118. The width of the central section 119c is greater than 150% of the thickness of the blade 118.

In another embodiment of the utility knife 110 (FIG. 7), the respective widths of the first end section 119b and the second end section 119d are each less than 115% of the thickness of the blade 118. The width of the central section 119c is greater than 170% of the thickness of the blade 118.

In a further embodiment of the utility knife 110 (FIG. 7), the central section 119c of the blade aperture 119a has a height greater than a respective height of both the first end section 119b and the second end section 119d of the blade aperture 119a.

In yet another embodiment of the utility knife 110 (FIG. 5), the blade aperture 119a is defined in the front end 115 of the body 114. The blade holder 119 is slidable relative to the body 114 to move the blade 118 through the blade aperture 119a between the extended position (FIGS. 5-7) and the retracted position (not shown).

In yet a further embodiment of the utility knife 110 (FIG. 7), the width of the first end section 119b is equal to the width of the second end section 119d and the height of the first end section 119b is equal to the height of the second end section 119d of the blade aperture 119a.

Figure 18:
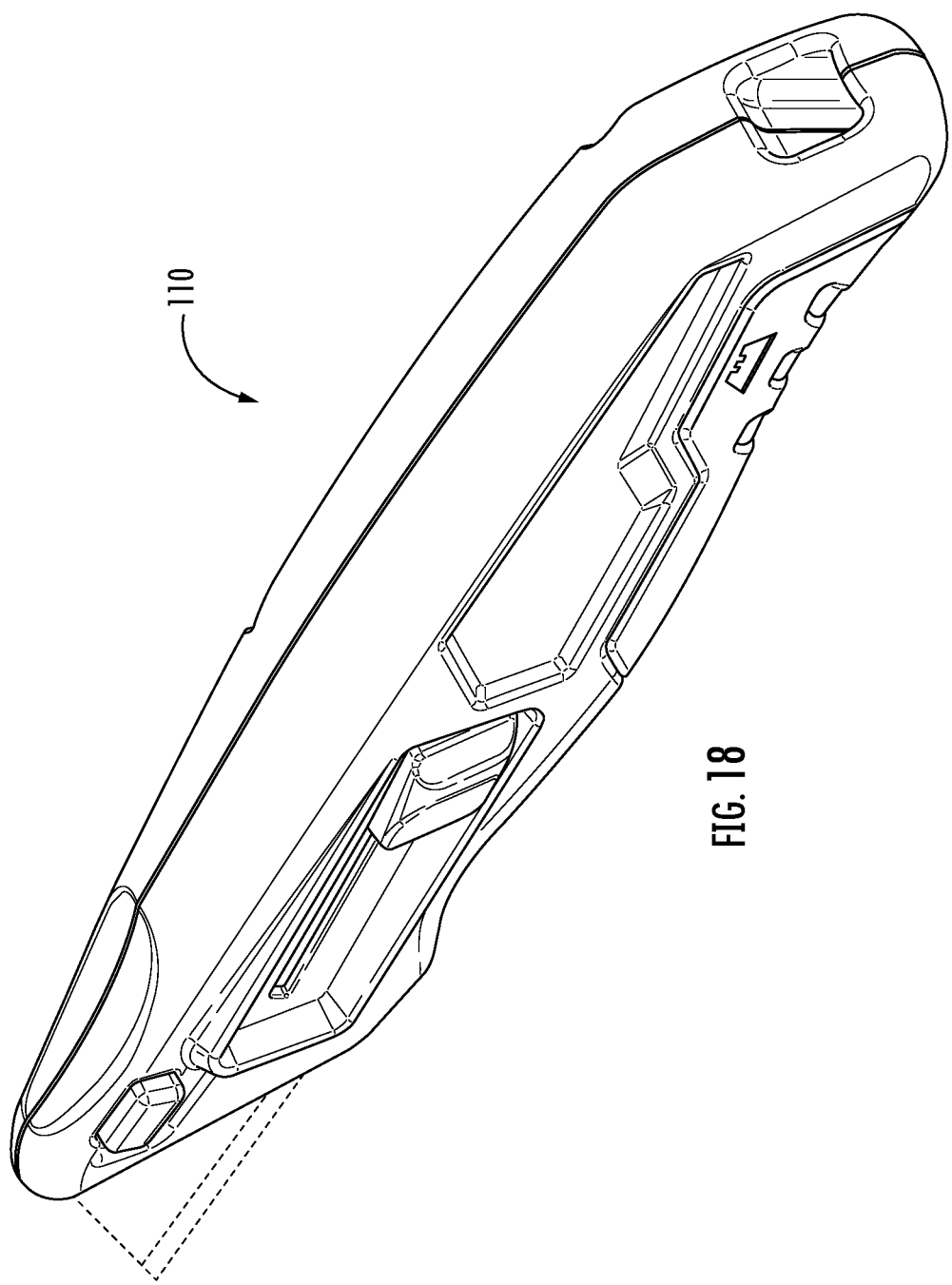
FIG. 18 is a perspective view of a utility knife with an integrated tape hook recess according to a further embodiment of the invention.
Figure 19:
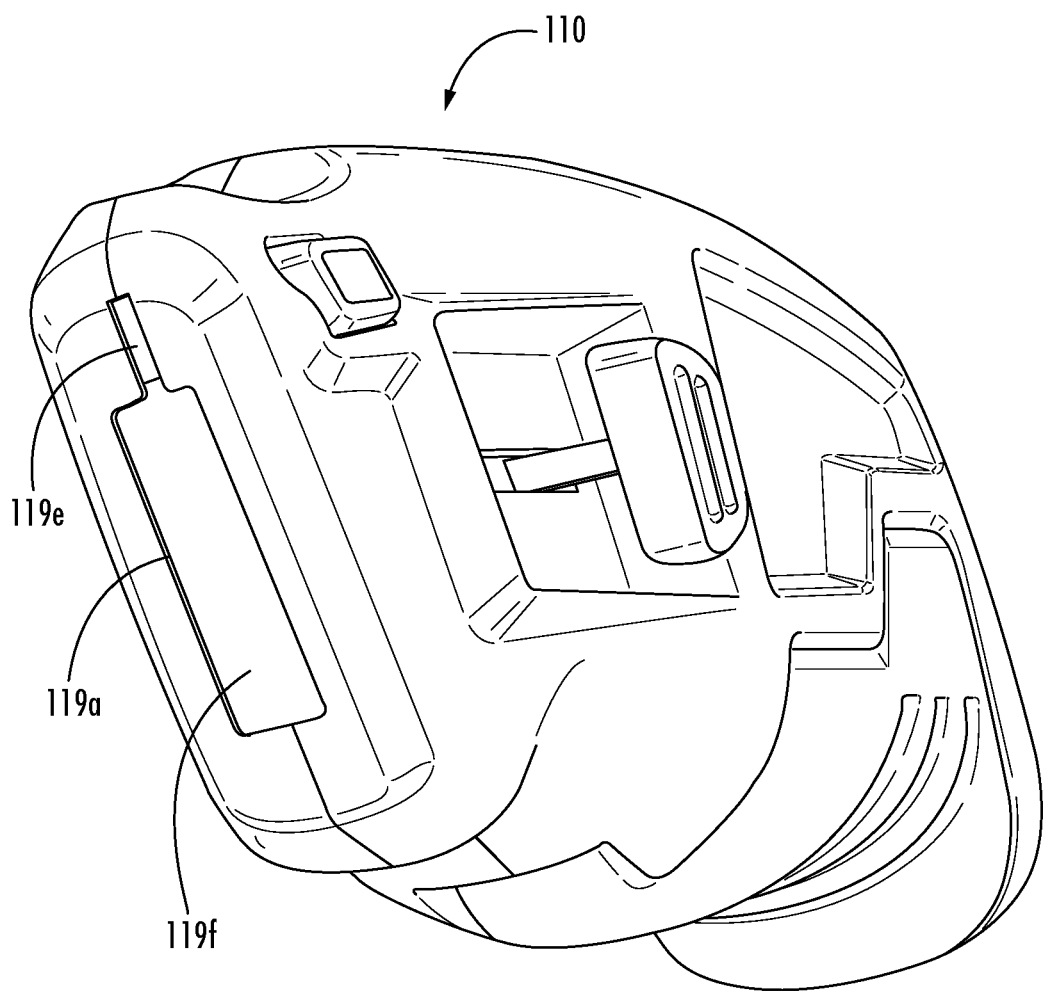
FIG. 19 is a front view of the utility knife of FIG. 18.

In yet another embodiment of the utility knife 110 (FIGS. 18 and 19), the blade aperture 119a includes a central section 119f having a width and a height, and a first end section 119e having a width and a height. The width of the central section 119f is greater than the width of the first end section 119e. The height of the central section 119f is greater than the height of the first end section 119e.

Referring to FIGS. 6A-B, the blade holder 119 includes a lock member 121 coupled to a resilient spring arm 123 that biases the lock member 121 toward a first body portion 134 of the body 114. The lock member 121 is coupled to an actuator button 125, which is slidable along a slot 127 in the first body portion 134. In the illustrated embodiment, projections 129 are formed inside the first body portion 134 and are spaced along the slot 127. The lock member 121 is selectively receivable between adjacent pairs of projections 129 in order to retain the blade holder 119 and the blade 118 in one of a plurality of predetermined positions (the fully extended position, the fully retracted position, and at least one intermediate position between the fully extended position and the fully retracted position. In order to adjust the blade holder 119 and the blade 118 between the various predetermined positions, the actuator button 125 is depressed inward, against the force of the spring arm 123, to disengage the lock member 121 from the projections 129. The blade holder 119 and the blade 118 can then be slid along the longitudinal axis 120 to a desired position and the actuator button 125 released to reengage the lock member 121 with the projections 129 under the influence of the spring arm 123.

Like the utility knife 10 described above, the utility knife 110 includes a first recess 162 that defines a gap or pocket 164 between the blade 118 and the first body portion 134, and a second recess 166 that defines a gap or pocket 168 between the blade 118 and a second body portion 138. The recesses 162, 166 are thus disposed on opposite lateral sides of the blade 118 and blade holder 119. The recesses 162, 166 extend into the body 114 along the longitudinal axis 120.

Referring to FIGS. 6C-6D, the recesses 162, 166 are sized and shaped to be able to receive the hook 70 of the tape measure 82 generally in the same manner described above with reference to the utility knife 10 of FIGS. 1-3. When the hook 70 is received in the recess 162, 166, the tape measure 82 is coupled to the utility knife 110 for movement therewith. This allows a user to not have to manually hold the hook 70 or the tape 82 to the utility knife 110. The utility knife 110 and tape measure 82 can then be conveniently used together to make efficient and accurate cuts on a workpiece, which is particularly advantageous when making long cuts such as when cutting sheet material.

FIGS. 8-13 illustrate a utility knife 210 according to another embodiment. The utility knife 210 is similar to the utility knife 110 described above with reference to FIGS. 5-7, and the following description focuses primarily on differences between the utility knife 210 and the utility knife 110. In addition, features of the utility knife 210 corresponding with features of the utility knife 110 are given like reference numbers plus 100.

The utility knife 210 includes a handle or body 214, a blade holder 219, and a blade 218 coupled to the blade holder 219. The blade holder 219 is pivotally coupled to the body 214 and movable (pivoted) between a folded, or retracted, position (not shown), in which at least the cutting edge of the blade 218 is received within the body 214, and an extended position (FIGS. 8 and 9), in which the blade holder 219 and the blade 218 extend from a front end 215 of the body 214. The knife 210 further includes a lock member 221 operable to selectively lock and unlock the blade holder 219 from either or both the extended position and the retracted position. In the illustrated embodiment, the lock member 221 is configured as a push button with a frusto-conical portion (not shown) that is engageable with an indentation 231 (FIG. 10) in the rear of the blade holder 219 to retain the blade holder 219 in the extended position. In other embodiments, other locking means may be used.

In another embodiment of the utility knife 210, the blade holder 219 includes a lock member 221 coupled to a resilient spring arm 123, similar to the resilient spring arm 123 shown in FIGS. 6A-6B.

Figure 10:
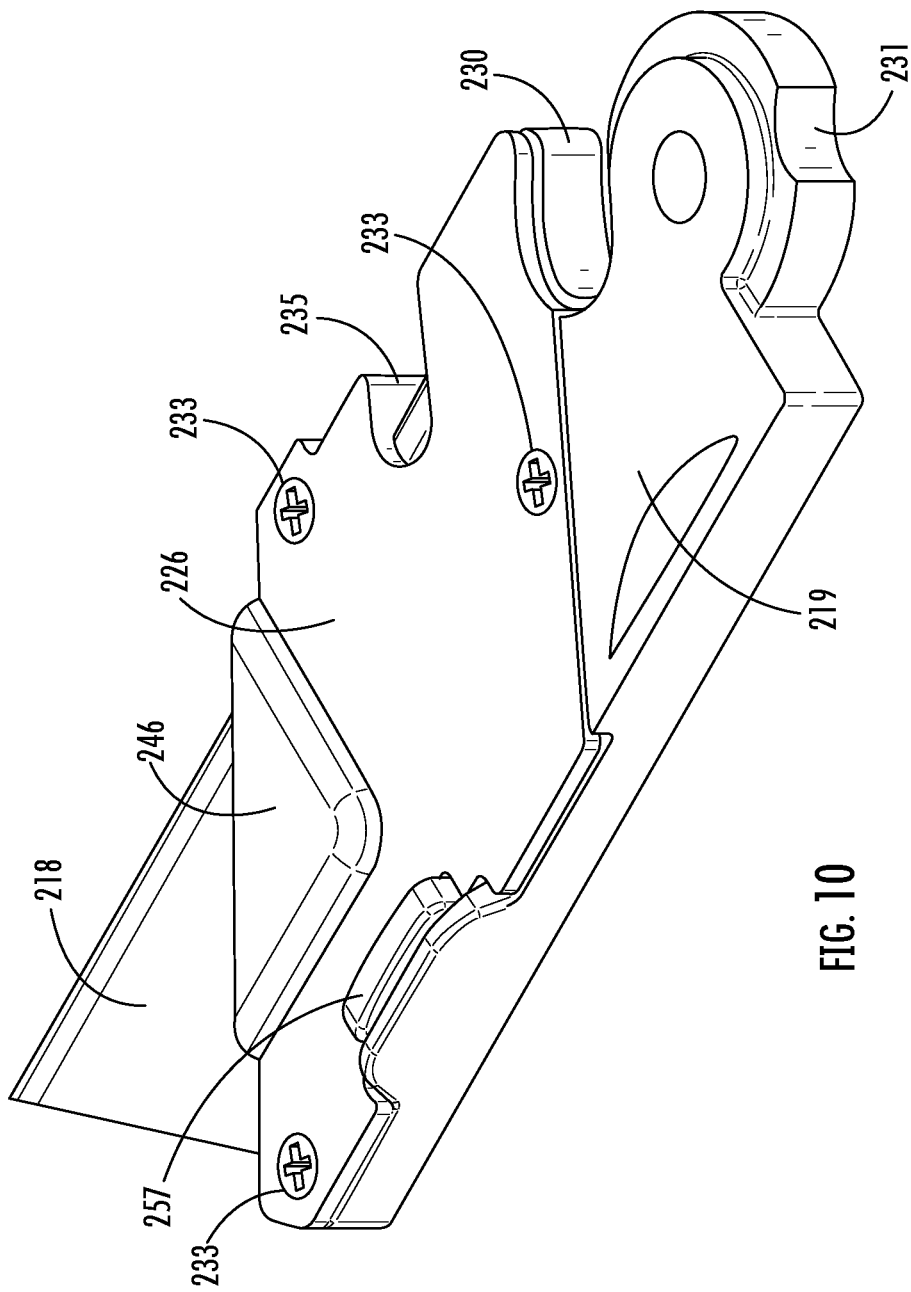
FIG. 10 is a perspective view of a blade holder of the utility knife of FIG. 8.
Figure 11:
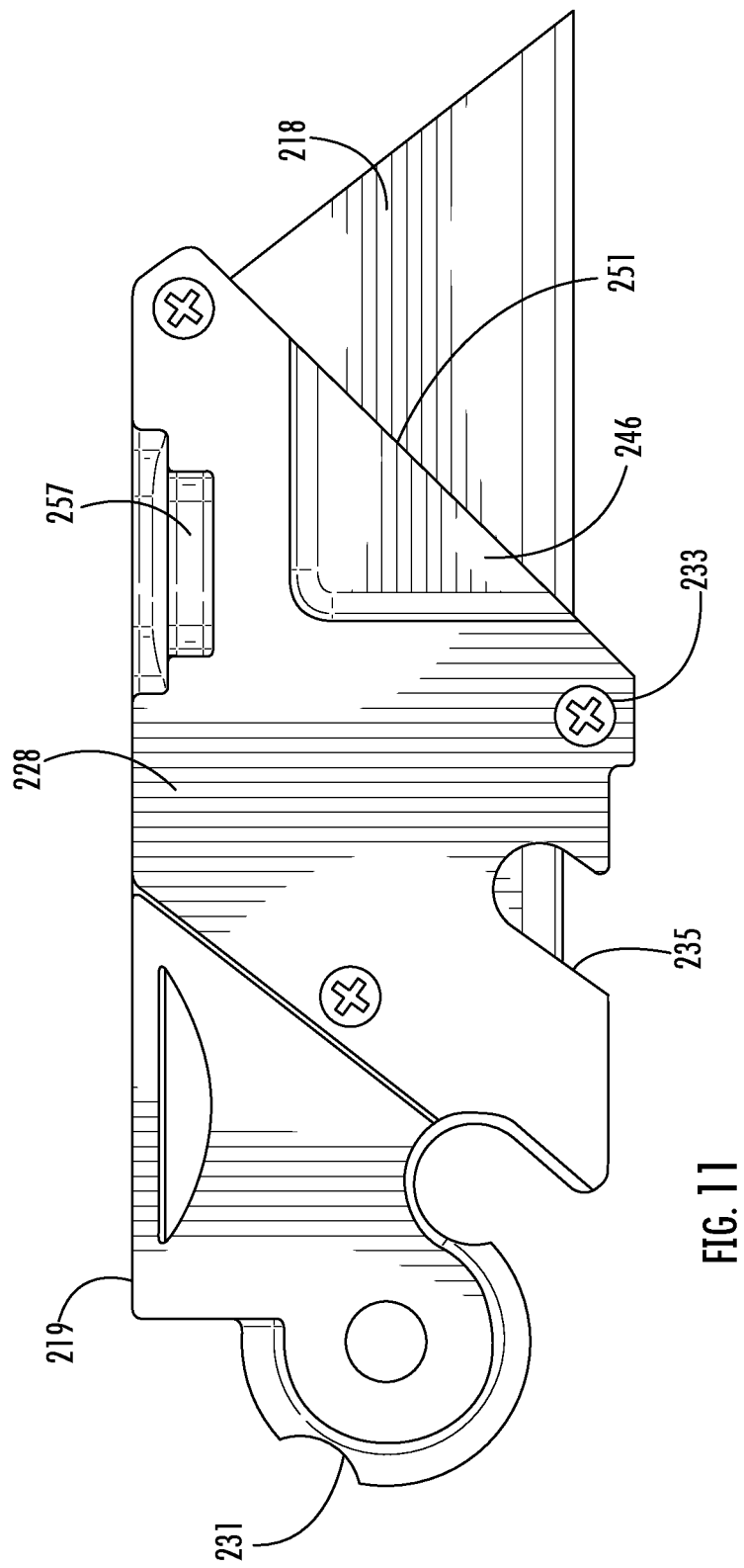
FIG. 11 is a side view of the blade holder of FIG. 10.
Figure 12:
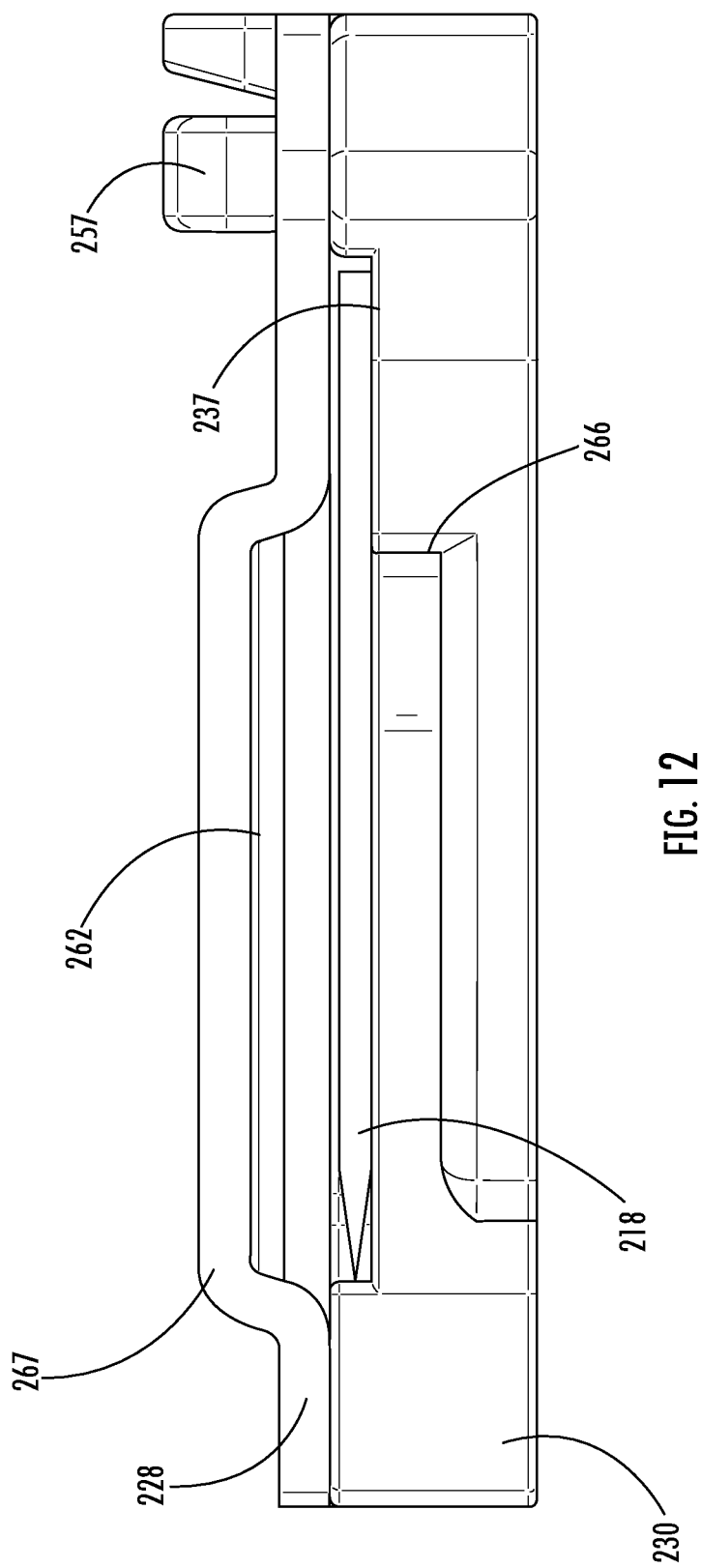
FIG. 12 is a front view of the blade holder of FIG. 10.
Figure 13:
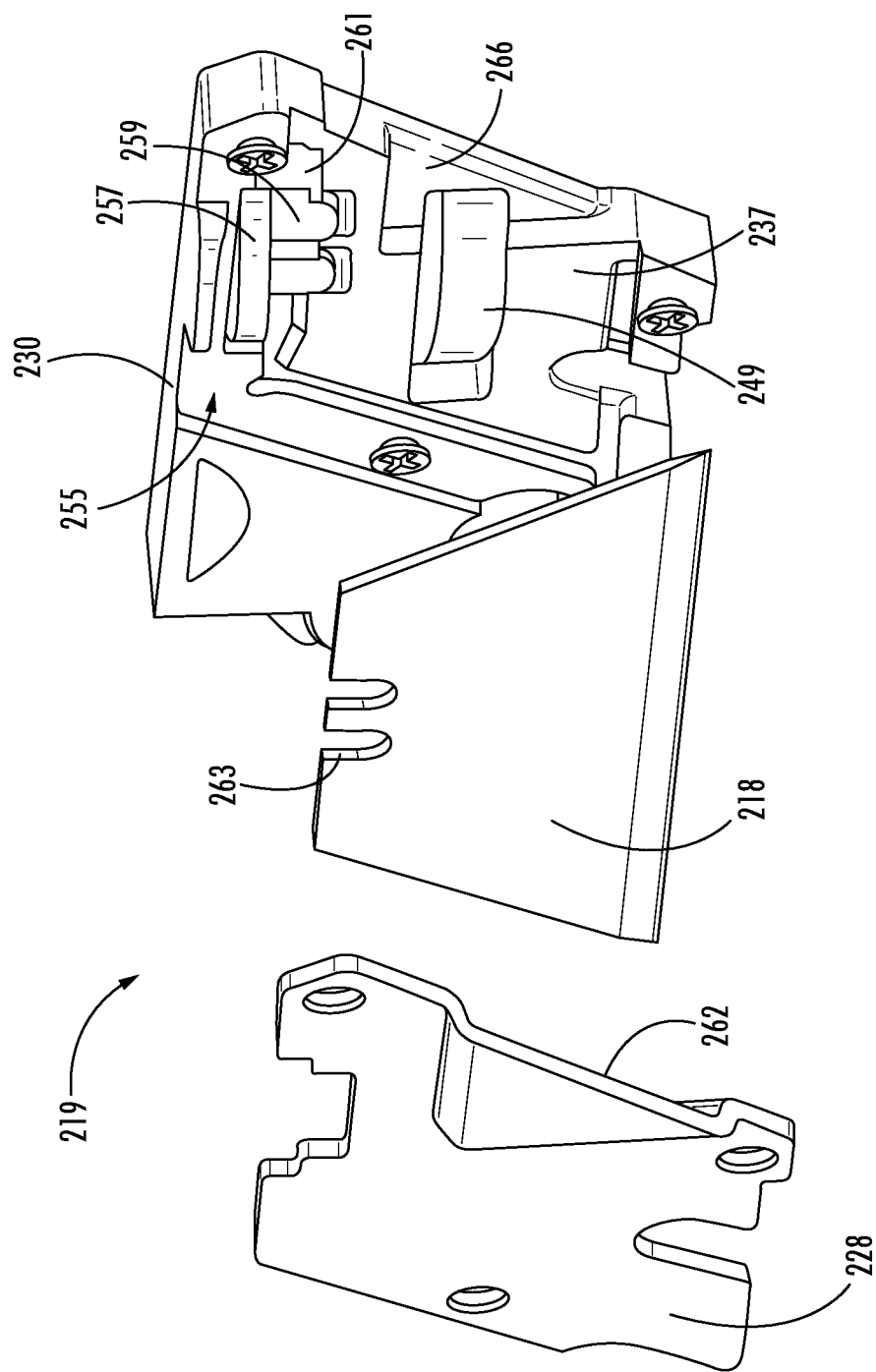
FIG. 13 is an exploded view of the blade holder of FIG. 10.

With reference to FIGS. 10-13, the illustrated blade holder 219 includes a spring 249, a main body portion 230 having a recessed section 237, and a side plate 228 coupled to the recessed section 237 of the main body portion 230. The side plate 228 is coupled to the main body portion 230 by a plurality of fasteners 233 (FIG. 10). In the illustrated embodiment, the side plate 228 and the main body portion 230 include a cutout 235 that exposes a rear portion of the cutting edge of the blade 218. The blade 218 is seated in a recessed section 237 of the main body 230 such that the blade 218 is sandwiched between the main body 230 and the side plate 228. The spring (for instance, a leaf spring) 249 presses the blade 218 against the side plate 228 (FIG. 13).

The side plate 228 and the main body 230 respectively define a first recess 262 and a second recess 266 (FIG. 12). In the illustrated embodiment, the side plate 228 has a generally constant thickness, with a portion 267 that is bent to define the first recess 262 (FIG. 12). The side plate 228 may be formed via a stamping process, for example. The recesses 262, 266 are located on opposite lateral sides of the blade 218, such that the first recess 262 defines a gap or pocket between the blade 218 and the side plate 228, and the second recess 266 defines a gap or pocket between the blade 218 and the main body 230. The illustrated recesses 262, 266 are generally shaped as right triangles, with a hypotenuse 251 that is coplanar with a front edge of the blade holder 219 (FIG. 11). In other embodiments, the recesses 262, 266 may have other shapes.

Referring to FIG. 13, a release mechanism 255 is positioned on the main body 230 to selectively couple the blade 218 to and release the blade 218 from the blade holder 219. In the illustrated embodiment, the release mechanism 255 includes a push button 257 with a pair of downwardly-extending legs 259 and a leaf spring 261 that biases the legs 259 into engagement with corresponding slots 263 formed in the blade 218. Depressing the push button 257 toward the main body 230 against the force of the leaf spring 261 displaces the legs 259 out of the slots 263 to release the blade 218 and permit its removal and replacement.

With continued reference to FIG. 13, a tab 265 extends laterally from the main body 230 adjacent and generally parallel to the push button 257. The tab 265 extends from the main body 230 approximately the same distance as the push button 257. Due to its placement in proximity to the push button 257, the tab 265 may advantageously inhibit inadvertent actuation of the push button 257.

In use, with the blade holder 219 in its extended position, the hook 70 on the tape measure 74 (FIG. 4) is hooked into one of the recesses 262, 266 on the blade holder 219 (FIGS. 12 and 13). Once hooked, the tape measure 82 is coupled to the utility knife 210 for movement therewith. This allows a user to not have to manually hold the hook 70 or the tape 82 to the utility knife 210. The utility knife 210 and tape measure 74 can then be conveniently used together to make efficient and accurate cuts on a workpiece, which is particularly advantageous when making long cuts such as when cutting sheet material.

Figure 14:
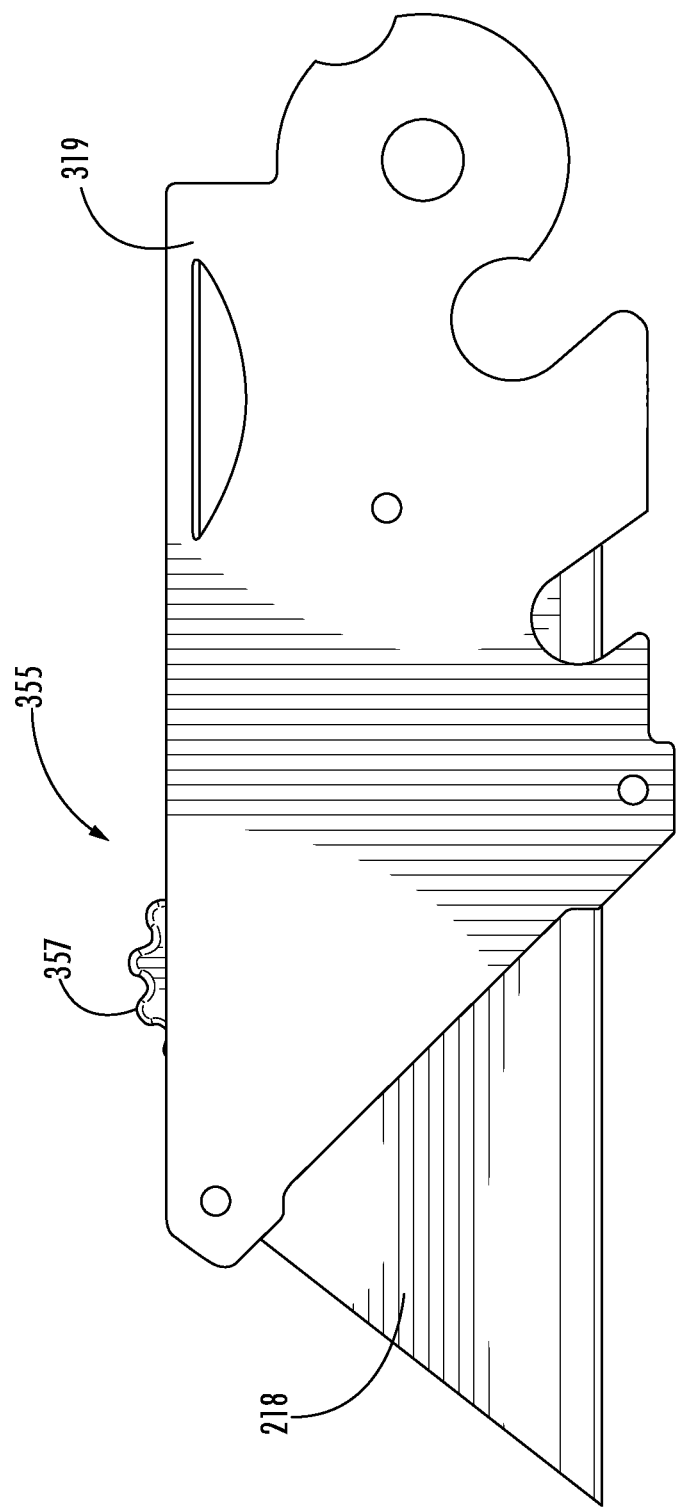
FIG. 14 is a left side view of a blade holder according to another embodiment, usable with the utility knife of FIG. 8.
Figure 15:
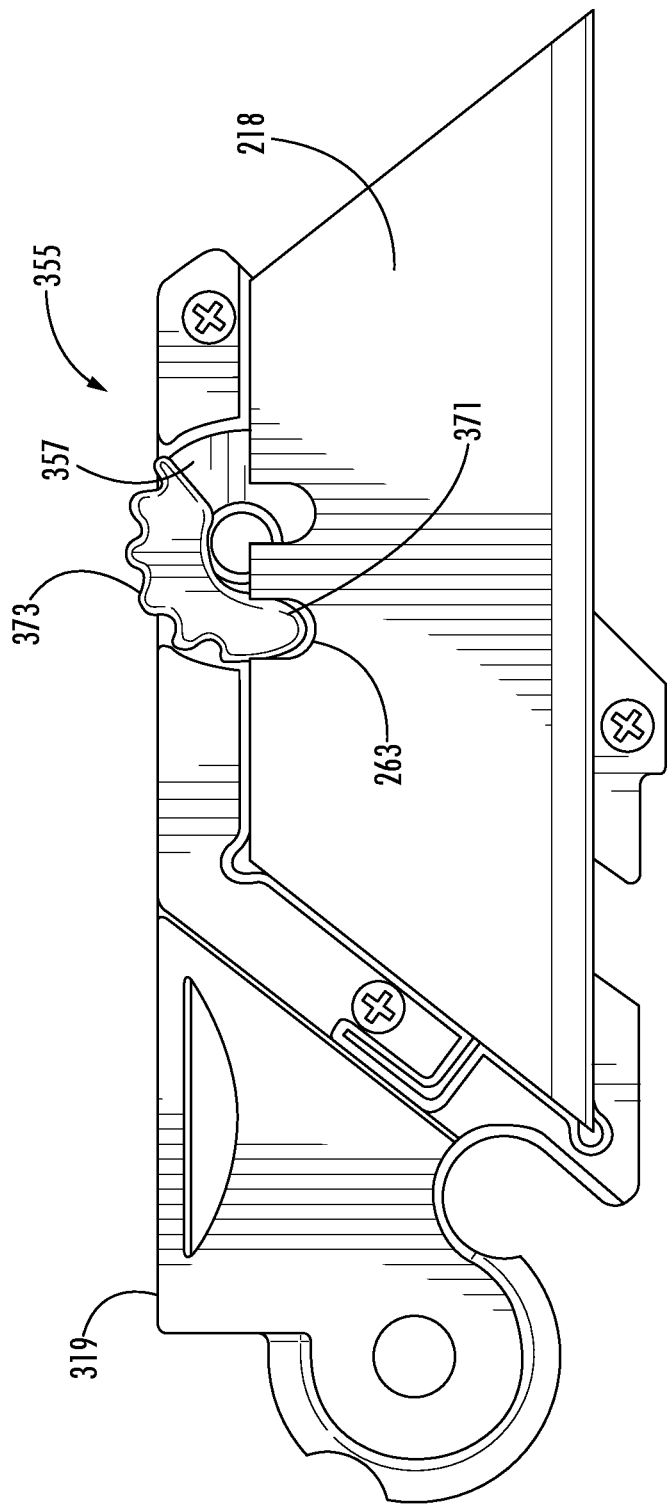
FIG. 15 is a right side view of the blade holder of FIG. 14.
Figure 16:
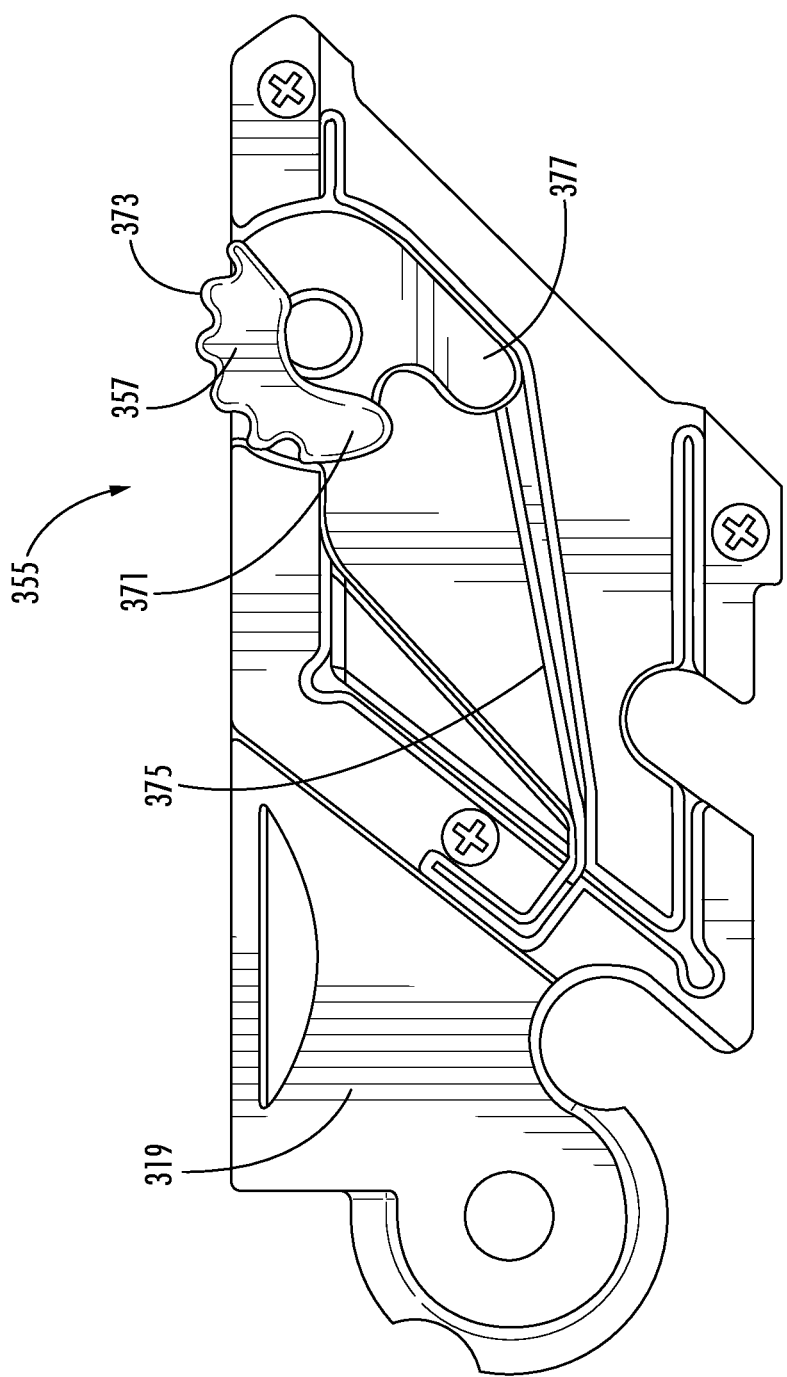
FIG. 16 is a right side view of the blade holder of FIG. 14 with the blade removed, illustrating a blade release mechanism of the blade holder.

FIGS. 14-16 illustrate a blade holder 319 according to another embodiment. The blade holder 319 is usable, for example, in place of the blade holder 219 described above with reference to FIGS. 10-13. The blade holder 319 is similar to the blade holder 219 but includes a release mechanism 355 with a rotatable actuator wheel 357. The actuator wheel 357 includes a laterally-projecting arcuate latch 371 extending from an arcuate knurled portion 373 (FIG. 15). The latch 371 is receivable within one of the slots 263 in the blade 218 to couple the blade 218 to the blade holder 319. Referring to FIG. 16, the release mechanism 355 further includes a spring arm 375 seated in the main body 330 of the blade holder 319. A distal end of the spring arm 375 engages a cam lobe 377 on the actuator wheel 357 to bias the actuator wheel 357 toward a latched position (FIG. 15) in which the latch 371 is received within the slot 263.

In use, to remove the blade 218 from the blade holder 319, the user rotates the actuator wheel 357 against the force of the spring arm 375 (i.e. clockwise in the orientation of FIGS. 15 and 16). The user's grip on the actuator wheel 357 is enhanced by the knurled portion 373. As the actuator wheel 357 rotates, the latch 371 is withdrawn from the slot 263 in the blade 218, allowing the blade 218 to be withdrawn from the blade holder 319

Figure 17:
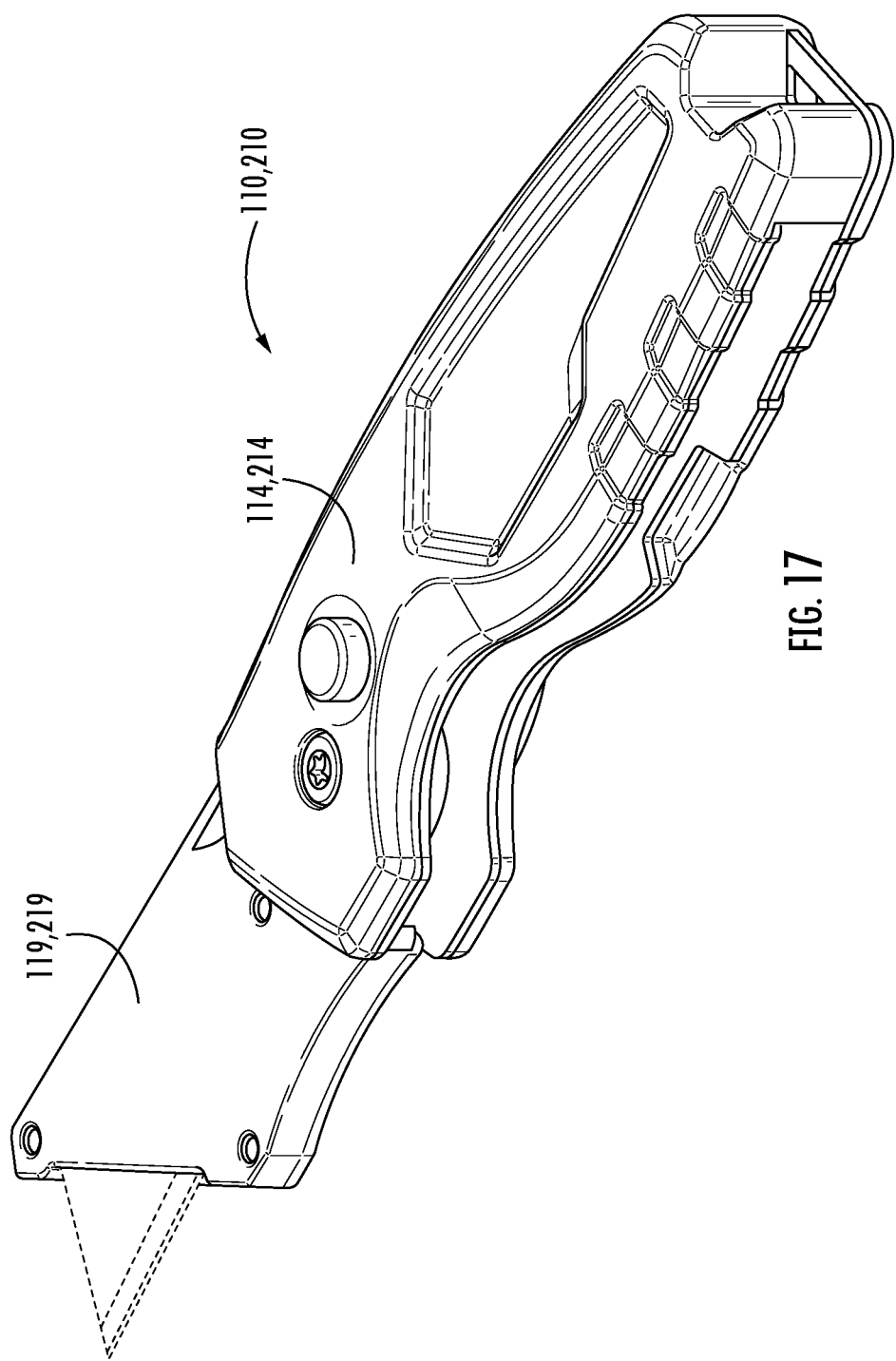
FIG. 17 is a perspective view of a utility knife with an integrated tape hook recess according to a further embodiment of the invention.

In any of the above embodiments, the utility knife 110, 210 may include a mechanism for moving the blade holder 119, 219 from an internal position (FIG. 17) within the body 114, 214 to an external position (not shown) in order to be used.

In an embodiment, a method of using a utility knife 110 (FIG. 7) includes grasping (not shown) a utility knife 110 having a blade aperture 119a and a blade 118 extending from the blade aperture 119a. A tape measure hook 70 attached to a tape blade 82 of a tape measure 74 (FIG. 4) is coupled to the blade aperture 119a of the utility knife 110 (FIGS. 6C and 6D). The tape blade 82 of the tape measure 74 is extended from a housing 78 of the tape measure 74 along a workpiece (not shown) to a desired measurement of the workpiece while the tape measure hook 70 is coupled to the blade aperture 119a of the utility knife 110. The workpiece is cut with the blade 118 of the utility knife 110 at the desired measurement while the tape measure hook 70 is coupled to the blade aperture 119a of the utility knife 110.

In another embodiment of the method, illustrated in FIG. 4, the tape measure 74 is locked in place via a locking mechanism 86 of the tape measure 74.

In a further embodiment of the method, the blade 118 of the utility knife 110 is extended through a front end 115 of the utility knife 110 (FIGS. 5-7).

Although the present disclosure has been described in detail with reference to certain preferred embodiments, variations and modifications exist within the scope and spirit of one or more independent aspects of the disclosure as described.

What is claimed is:
1. A utility knife comprising:
a body comprising a front end and a rear end opposite the front end and a first body portion cooperating with and coupled to a second body portion, the first and second body portions both extend along a length direction of the body between the front end and rear ends and together define an interior portion of the body;
a blade holder supported by the body within the interior portion of the body, the blade holder moveable relative to the body to move a blade between an extended position and a retracted position, wherein the first body portion surrounds a first side of the blade holder and the second body portion surrounds a second side of the blade holder such that the blade holder is enclosed within the body; and a blade aperture positioned at the front end of the body, the blade aperture defined between a first edge of the first body portion and a second edge of the second body portion, through which the blade extends out of the body when in the extended position, the blade aperture including a central section having a width defined between the first edge of the first body portion and the second edge of the second body portion and a height and a first end section having a width and a height, the width of the central section is greater than the width of the first end section, the height of the central section is greater than the height of the first end section;

wherein the first edge of the first body portion faces a first side of the blade and the second edge of the second body portion faces a second side of the blade and wherein the first edge of the first body portion opposes the second edge of the second body portion when the first body portion is coupled to the second body portion.

2. The utility knife of claim 1, wherein the blade aperture further comprises a second end section having a width and a height, the width of the central section is greater than the width of the second end section, the height of the central section is greater than the height of the second end section.

3. The utility knife of claim 2, wherein the respective widths of the first end section and the second end section of the blade aperture are each less than 50% of the width of the central section of the blade aperture, and the height of the central section of the blade aperture is greater than 80% of both of the respective heights of the first end section and the second end section of the blade aperture.

4. The utility knife of claim 2, wherein the width of the first end section is equal to the width of the second end section, and the height of the first end section is equal to the height of the second end section.

5. The utility knife of claim 1, wherein the blade aperture is defined in the front end of the body, wherein the blade holder is slidable relative to the body to move the blade through the blade aperture between the extended position and the retracted position.

6. The utility knife of claim 1, wherein the blade holder comprises a lock member coupled to a resilient spring arm.

7. The utility knife of claim 6, wherein the lock member is coupled to an actuator button wherein the actuator button is slidable along a slot that extends through the first body portion of the body.

8. The utility knife of claim 7, further comprising a plurality of projections formed on the interior portion of the body and spaced along the slot such that the lock member is selectively receivable between adjacent pairs of projections to retain the blade holder in a position.

9. The utility knife of claim 1, wherein the blade projects a maximum distance from the front end when in a fully extended position and the blade is enclosed by the body when in a fully retracted position.

10. The utility knife of claim 1, wherein the blade holder further includes an outer surface defining an outer perimeter and the first body portion includes a first interior surface and the second body portion includes a second interior surface, wherein the first interior surface and second interior surface together extend around the outer perimeter of the blade holder.

* * * * *